United States Patent
Iwakura et al.

(10) Patent No.: US 7,153,607 B2
(45) Date of Patent: Dec. 26, 2006

(54) ALKALINE ZINC SECONDARY CELL AND METHOD FOR PREPARATION THEREOF

(75) Inventors: Chiaki Iwakura, Osaka (JP); Naoji Furukawa, Kyoto (JP); Yoichi Izumi, Osaka (JP); Yoshinori Toyoguchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 151 days.

(21) Appl. No.: 10/129,488

(22) PCT Filed: Aug. 3, 2001

(86) PCT No.: PCT/JP01/06715

§ 371 (c)(1),
(2), (4) Date: May 6, 2002

(87) PCT Pub. No.: WO02/23663

PCT Pub. Date: Mar. 21, 2002

(65) Prior Publication Data

US 2002/0164530 A1  Nov. 7, 2002

(30) Foreign Application Priority Data

Sep. 11, 2000  (JP) .............................. 2000-274622

(51) Int. Cl.
*H01M 4/02* (2006.01)
*H01M 4/42* (2006.01)
*H01M 6/14* (2006.01)
*H01M 6/18* (2006.01)

(52) U.S. Cl. ................ 429/229; 429/209; 429/300; 429/306

(58) Field of Classification Search ............. 429/209, 429/229, 300, 306, 324
See application file for complete search history.

(56) References Cited

U.S. PATENT DOCUMENTS

| 5,558,682 | A  | * | 9/1996 | Urairi et al. ............... 29/623.5 |
| 6,268,082 | B1 | * | 7/2001 | Hiruma et al. ........... 429/218.1 |
| 6,355,375 | B1 | * | 3/2002 | Tanaka et al. .............. 429/142 |
| 6,511,774 | B1 | * | 1/2003 | Tsukuda et al. ............ 429/247 |

FOREIGN PATENT DOCUMENTS

| EP | 0 948 074 A2 |   | 10/1999 |
| JP | 50-28639     | * | 3/1975  |
| JP | 56-32674     | * | 4/1981  |
| JP | 57-152677    | * | 9/1982  |
| JP | 5-258767 A   |   | 10/1993 |

(Continued)

OTHER PUBLICATIONS

Davic Linden, "Handbook of Battery," 2nd Edition, McGraw-Hill, Inc., (1995).*

(Continued)

*Primary Examiner*—Dah-Wei Yuan
(74) *Attorney, Agent, or Firm*—McDermott Will & Emery LLP

(57) ABSTRACT

An alkaline zinc secondary battery in accordance with the present invention comprises a separator layer comprising a gel electrolyte comprising a water absorbent polymer and an alkaline aqueous solution, disposed between a negative electrode comprising at least one selected from the group consisting of zinc and zinc oxide and a positive electrode. Because the separator layer is in a gel form, transfer of zinc ions is limited. Thereby, deformation of the negative electrode and generation of dendrite due to charge and discharge of the battery are substantially inhibited. Moreover, since impurity ions such as nitrate ions become less prone to move, self-discharge of the battery is also inhibited.

20 Claims, 2 Drawing Sheets

FOREIGN PATENT DOCUMENTS

| | | |
|---|---|---|
| JP | 10-40897 | 2/1998 |
| JP | 11-260339 | 9/1999 |
| JP | 11-345629 A | 12/1999 |

OTHER PUBLICATIONS

Webster's II New Riverside University Dictionary.*

* cited by examiner

ALKALINE ZINC SECONDARY CELL AND METHOD FOR PREPARATION THEREOF

TECHNICAL FIELD

The present invention relates to an alkaline zinc secondary battery. More specifically, the present invention relates to an alkaline zinc secondary battery equipped with a separator layer comprising a gel electrolyte comprising a water absorbent polymer and an alkaline aqueous solution.

BACKGROUND ART

An alkaline zinc secondary battery has a high energy density because the negative electrode comprises zinc. Moreover, zinc is favorably cheaper than a hydrogen storage alloy or the like. However, it has a high degree of solubility in an alkaline electrolyte. This leads to deformation of the negative electrode comprising zinc or to generation of dendrite, as charge/discharge cycles are carried out. These cause an internal short-circuit. And self-discharge of the alkaline zinc secondary battery is larger than that of any non-aqueous-type secondary battery.

In order to prevent internal short-circuit due to generation of the dendrite, proposed has been a technique using a separator comprising regenerated cellulose or polyvinyl alcohol or using a separator comprising a polyolefin micro-porous film which has been processed with a surfactant.

However, in a case where regenerated cellulose or polyvinyl alcohol is used for the separator, the alkaline electrolyte causes the separator to deteriorate. It is thus difficult to maintain the effect for a long time. Also in a case where the polyolefin micro-porous film was used for the separator, it cannot be said that the effect of preventing deformation of the negative electrode and internal short-circuit due to generation of the dendrite is sufficient. And there remains a challenge of inhibiting the self-discharge of the battery.

DISCLOSURE OF INVENTION

The present invention relates to an alkaline zinc secondary battery comprising: a positive electrode; a negative electrode comprising at least one selected from the group consisting of zinc and zinc oxide; and a separator layer comprising a gel electrolyte, characterized in that the gel electrolyte comprises a water absorbent polymer and an alkaline aqueous solution.

As for the water absorbent polymer, a cross-linked polymer containing at least one monomer unit selected from the group consisting of an acrylate unit and a methacrylate unit can be used.

It is preferable that the separator layer further comprises a water repellent. Fluorinated carbon or fluorocarbon resin can be used as the water repellent.

The separator layer may be formed by combining the water absorbent polymer and a core made of non-woven fabric comprising polyolefin or polyamide, or a micro-porous film comprising polyolefin or regenerated cellulose.

It is desirable that the separator layer is in intimate contact with at least either the surface of the positive electrode or the surface of the negative electrode.

It is desirable that the core is present at about the center of the depth of the separator layer, or on either side or both sides of the surface of the separator layer.

It is desirable that the separator layer further comprises a binder comprising at least one selected from the group consisting of polyethylene, polypropylene, carboxymethyl cellulose, styrene-butadiene rubber and polyvinyl alcohol, so as to improve the workability and durability of the separator layer.

Air permeability across the separator layer is, for example, from 1 to 100 ml/cm$^2$·s at a pressure difference of from 120 to 130 Pa. It is preferable that the separator layer has a thickness of from 5 to 200 µm.

The present invention also relates to a method for producing an alkaline zinc secondary battery comprising the steps of: (1) a first step of producing a negative electrode comprising at least one selected from the group consisting of zinc and zinc oxide and a positive electrode; (2) a second step of mixing a water absorbent polymer and an alkaline aqueous solution, the mixture then being used to produce a separator layer in a sheet form comprising a gel electrolyte; (3) a third step of laminating the positive electrode and the negative electrode with the separator layer disposed therebetween, to obtain an electrode assembly; and, (4) a forth step of fabricating an alkaline zinc secondary battery with the use of the electrode assembly obtained in the third step.

Moreover, the present invention relates to a method for producing an alkaline zinc secondary battery comprising the steps of: (1) a first step of producing a negative electrode comprising at least one selected from the group consisting of zinc and zinc oxide and a positive electrode; (2) a second step of mixing a water absorbent polymer and an alkaline aqueous solution, the mixture then being applied on at least either the surface of the positive electrode or the surface of the negative electrode to form a separator layer comprising a gel electrolyte which is in intimate contact with the surface; (3) a third step of laminating the positive electrode and the negative electrode with the separator layer disposed therebetween to obtain an electrode assembly; and, (4) a forth step of fabricating an alkaline zinc secondary battery with the use of the electrode assembly obtained in the third step.

BEST MODE FOR CARRYING OUT THE INVENTION

Figure 1:
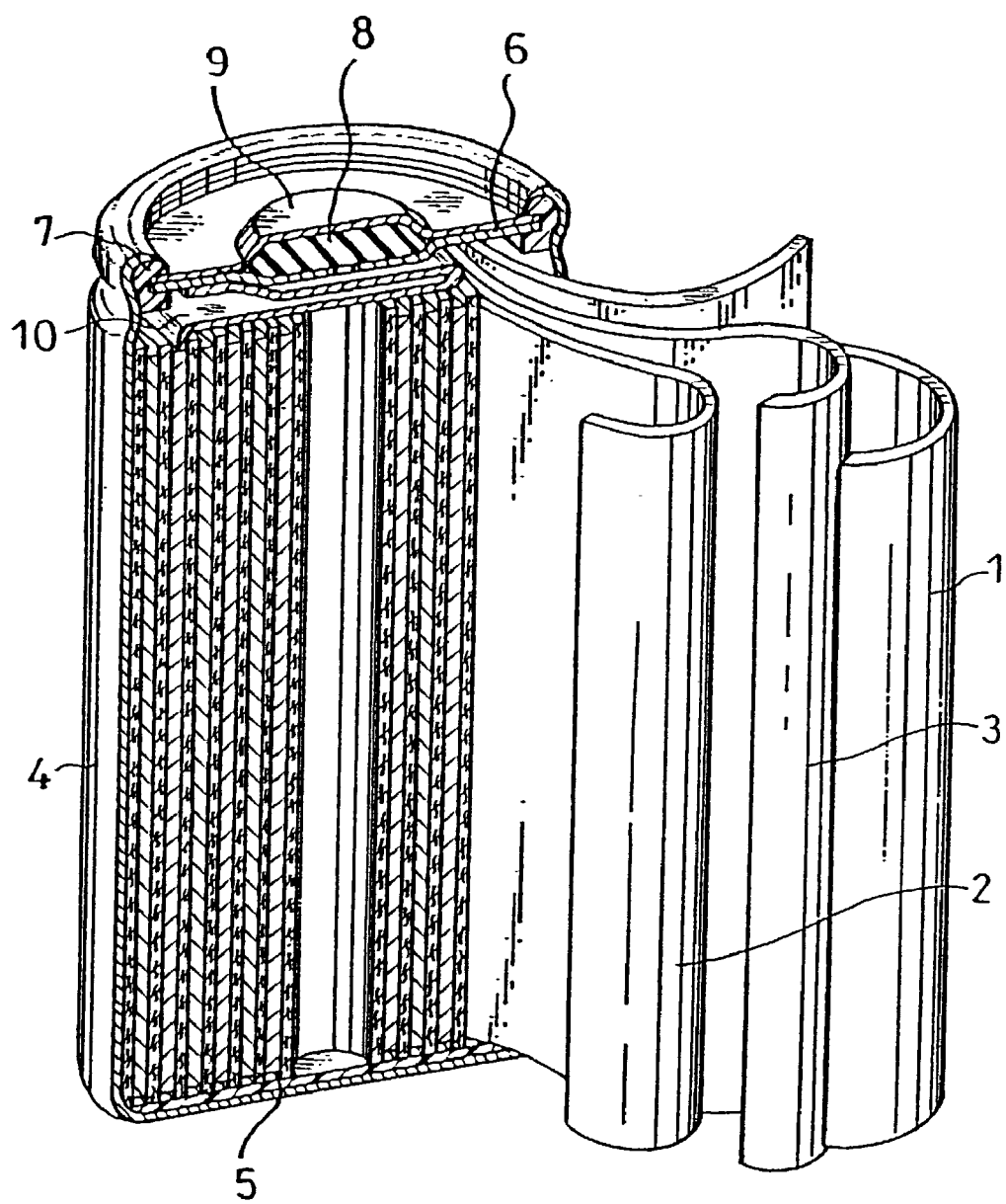
FIG. 1 is a longitudinal sectional view of one example of alkaline zinc secondary batteries in accordance with the present invention.

An alkaline zinc secondary battery in accordance with the present invention has, between a negative electrode comprising at least one selected from the group consisting of zinc and zinc oxide and a positive electrode, a separator layer comprising a gel electrolyte comprising a water absorbent polymer and an alkaline aqueous solution.

The separator layer has the right ion conductivity because it contains the alkaline aqueous solution. Also, the separator layer is resistant to increasing internal resistance because it is in a gel form due to containment of the water absorbent polymer and is excellent in maintaining the alkaline aqueous solution.

With the separator layer in a gel form, corrosion of zinc is relatively hard to promote. And, even in a case where zinc is dissolved in the alkaline aqueous solution, transfer of zinc ions is limited. This lowers a probability that the zinc ions dissolved from some part deposit on the other part. Deformation of the negative electrode and generation of the dendrite are therefore inhibited extensively as the charge/discharge of the battery are carried out. As a result, cycle life of the battery becomes significantly long, as compared with conventional batteries. Besides, as impurity ions such as nitrate ions become less prone to move, the self-discharge of the battery is also inhibited.

As for the water absorbent polymer, a polymer having a hydrophilic group can be used without any specific limitation. For example, alkali metal salt of a polymer can be used.

As for the above polymer, used can be polyacrylic acid, polymethacrylic acid, a copolymer of acrylic acid and methacrylic acid, a copolymer of isobutylene and maleic acid, poly(2-acrylamide-2-methylpropane sulfonic acid), poly(acryloxypropane sulfonic acid) and poly(vinyl phosphonic acid). While these polymers have many acidic groups, all the acidic groups are not necessarily required to form an alkali metal salt. The water absorbent polymers may be used singly or in combination of two or more of them.

Among the water absorbent polymers, particularly preferable ones are potassium polyacrylate, sodium, polyacrylate, potassium polymethacrylate and sodium polymethacrylate.

It is preferable that the water absorbent polymers are cross-linked polymers. The water absorbent polymer can be cross-linked by, for example, adding a cross-linking agent such as divinyl benzene in preparation of a polymer such as polyacrylic acid, polymethacrylic acid or a copolymer of acrylic acid and methacrylic acid. Also used may be ionomers, obtained by cross-linking a polymer, such as polyacrylic acid, polymethacrylic acid, or a copolymer of acrylic acid and methacrylic acid, with metal ions.

When the separator layer further comprises a water repellent, gas permeability across the separator layer becomes satisfactory. Thereby, even relatively rapid overcharge of the battery can hardly increase the internal pressure of the battery.

The water repellents to be used may be exemplified by fluorinated carbon and fluorocarbon resin. It is preferable that fluorinated carbon contains fluorine atoms and carbon atoms in a molar ratio of 1:1. Fluorinated carbon represented by $CF_x(x<1)$ can also be used. Meanwhile, fluorocarbon resin to be used may be exemplified by polytetrafluoroethylene.

The separator layer may also be formed by combining the above-mentioned water absorbent polymer and a core which has conventionally been in an extensive use. As for the core, a non-woven fabric comprising polyolefin or polyamide or a micro-porous film comprising polyolefin or regenerated cellulose may be used.

The water absorbent polymer can be contained in the core by soaking or applying the water absorbent polymer in or on the core.

Therein, a core containing no water absorbent polymer has conventionally been applied to the separator. However, this application requires a hydrophilic treatment or the like of the core containing no water absorbent polymer so as to improve the ability thereof to retain a liquid. In a case where the water absorbent polymer is soaked or applied in or on the non-woven fabric or the micro-porous film to be used as the separator layer, on the other hand, there is no need for the hydrophilic treatment of the non-woven fabric or the micro-porous film, since the water absorbent polymer itself is hydrophilic. Production cost of the battery in the present invention can therefore be lowered.

It is preferable that the separator layer is from 5 to 200 μm thick. Being too thin, the separator layer does not have a sufficient strength, being likely to raise a problem such as the internal short-circuit of the battery. When the separator layer has a thickness of over 200 μm, on the other hand, the battery becomes too thick, air permeability across the separator layer becomes small or the internal resistance of the battery becomes large.

Next, one example of production methods of the alkaline zinc secondary battery in accordance with the present invention will be described, referring to FIG. 1. FIG. 1 is a longitudinal sectional view of the one example of a cylindrical alkaline zinc secondary battery of the present invention. In FIG. 1, numeral 1 denotes a positive electrode, numeral 2 denotes a negative electrode comprising at least one selected from the group consisting of zinc and zinc oxide, and numeral 3 denotes a separator layer, respectively.

The positive electrode 1 and the negative electrode 2 are produced by applying, respectively, a positive electrode material mixture and a negative electrode material mixture on a current corrector such as a metal foil or expanded metal. The two electrodes immediately after the production are usually in a strip form. The positive electrode 1 and the negative electrode 2 may be produced in the same way as the conventional one.

The separator layer 3 comprises a water absorbent polymer and an alkaline aqueous solution, and may further comprise a water repellent and a core made of a non-woven fabric or a micro-porous film, as mentioned above.

The separator layer 3 is formed by first mixing the water absorbent polymer and the alkaline aqueous solution. At that time, the water repellent or a binder is added to the mixture, as necessary.

The proper amount of the water repellent per 100 parts by weight of the total of the water absorbent polymer and the alkaline aqueous solution is 8 parts by weight or less. The water repellent in too large an amount increases the internal resistance of the battery. The proper amount of the binder per 100 parts by weight of the total of the water absorbent polymer and the alkaline aqueous solution is from 0.1 to 2 parts by weight. The mixing proportion of the alkaline aqueous solution and the water absorbent polymer may be selected according to the kind of the water absorbent polymer. The preferable specific gravity of the alkaline aqueous solution is from 1.1 to 1.4 g/ml.

Subsequently, the obtained mixture of an even thickness is applied on a surface of a glass substrate or the like that has a smooth surface, which is dried to a certain degree and gelled. The obtained gel is then peeled off the substrate to obtain a sheet-like separator layer. When the obtained mixture is soaked in or applied on the core and then dried to a certain degree, a separator layer having the core can be obtained. When the obtained mixture is interposed between the cores and then dried to a certain degree, a separator layer having cores on both faces of the surface can be obtained.

The separator layer thus obtained is assembled with the positive electrode 1 and the negative electrode 2 into an alkaline zinc secondary battery in the same way as the conventional one. First, the positive electrode 1 and the negative electrode 2 are laminated with the separator layer 3 interposed between the two electrodes, which is rolled up to form an electrode assembly. An insulating plate 5 is arranged on the bottom of the electrode assembly, which is then accommodated in a metallic container 4. Thereafter, the alkaline aqueous solution is poured into the container 4.

A separator layer in intimate contact with the surface of the electrode may be formed by applying the mixture of the water absorbent polymer and the alkaline aqueous solution on one face or both faces of the electrode. In this case, the positive electrode and the negative electrode are laminated via the separator layer in intimate contact with the surface of the electrode, to assemble the alkaline zinc secondary battery. This configuration of the battery makes it unnecessary to laminate and roll up three members of the positive electrode, the negative electrode and the separator layer in the production process of the battery. The use of the positive electrode and the negative electrode, which are integrated with the separator layer, prevents misalignment of the electrode plates and the separator layer, so that productivity of the battery is improved.

The opening of the container 4 is sealed with a sealing plate 6. The sealing plate 6 is integrated with a cap 9 having a positive electrode terminal. The sealing plate 6 comprises a safety valve 8 made of a rubber for blocking a vent connecting the inside and the outside of the container. The sealing plate 6 has an insulating gasket 7 in the periphery thereof. The gasket 7 is provided for insulating the positive electrode terminal and a negative electrode terminal and also for sealing the battery. As a gas generates inside the battery and the internal pressure increases, the safety valve 8 transforms, and thereby the gas was released from the vent connecting the inside and the outside of the container.

The positive electrode constituting the electrode assembly is connected to a positive electrode lead 10, and the positive electrode lead 10 is connected to the positive electrode terminal of the sealing plate 6. A part of the negative electrode placed in the outermost part of the electrode assembly is in contact with the internal face of the metallic container 4. The outer face of the container is covered with an insulating material, except for the bottom thereof. The outer face of bottom of the container becomes the negative electrode terminal.

Next, the present invention will be described concretely, with reference to the examples.

EXAMPLE 1

First, production of the positive electrode will be described. As a positive electrode active material, nickel hydroxide containing Co and Zn was used. 10 parts by weight of cobalt hydroxide was added to 100 parts by weight of this active material, which was then added with a proper amount of water and mixed. Subsequently, the obtained paste-like mixture was filled into the pores of a foamed nickel sheet having a thickness of 1.2 mm. The foamed nickel sheet filled with the active material was dried, followed by rolling and cutting, to produce the positive electrode. A positive electrode lead was connected to the positive electrode.

Next, production of the negative electrode will be described. A zinc powder, a zinc oxide powder, acetylene black as a conductive agent and polytetrafluoroethylene as a binder were mixed in a weight ratio of 5:90:4:1. The mixture was then added with a proper amount of ethanol to give a paste-like mixture, which was then filled into the pores of a foamed copper sheet having a thickness of 1.2 mm. The foamed copper sheet filled with the active material was dried, followed by rolling and cutting, to produce the negative electrode. A negative electrode lead was connected to the negative electrode.

Subsequently, production of the separator layer will be described. 10 Gram of cross-linked type potassium polyacrylate, 125 g of an aqueous solution of potassium hydroxide having a specific gravity of 1.25 g/ml, 0.1 g of carboxymethyl cellulose and 6.75 g of a polytetrafluoroethylene powder were mixed and gelled. The gel was applied on a surface of a glass plate having a smooth surface, dried and then peeled. The resultant sheet-like gel was rolled to be 150 μm thick, which was then cut so that the separator layer was produced. Air permeability across the separator layer thus produced was 20 ml/cm$^2$·s at a pressure difference of 124 Pa.

The positive electrode and the negative electrode with the separator layer disposed therebetween were rolled up to give an electrode assembly. A ring-like insulating plate was arranged on the bottom of the electrode assembly, which was then accommodated in an AA-sized container. The negative electrode lead was spot-welded on the bottom of the container. An aqueous solution of potassium hydroxide of a specific gravity of 1.3 g/ml was poured into the container as the electrolyte. The insulating plate was placed on the electrode assembly, and the opening of the container was sealed with a sealing plate equipped with a safety valve and a positive electrode cap. In advance of the sealing, the positive electrode lead and the positive electrode cap had been electrically connected to each other. A sealed battery was thus produced. The battery will be referred to as a battery A.

Six articles of the battery A each having a nominal capacity of 1000 mAh in an initial state were prepared. Three of them were repeatedly charged and discharged at an ambient temperature of 25° C. to obtain the cycle life thereof. During charging, the maximum charge current was 0.1 A, the maximum charge voltage was 1.75 V, and the charge lasted for 12 hours. There was a one-hour break after the charge. During discharging, the discharge current was 0.2 A, and the terminal discharge voltage was 1 V. The result was that: the discharge capacity measured at an initial stage of the charge/discharge cycles was approximately 1000 mAh; the cycle number at which the discharge capacity became 600 mAh was 250 on average.

The other three batteries were tested in terms of a self-discharge characteristic. First, The discharge capacity of each of the three batteries at 20° C. was measured. Second, the batteries were fully charged at 20° C. Then, each battery was stored at 45° C. for 30 days. After that, the temperature of the batteries was lowered back to 20° C. and the discharge capacity of each battery was measured. A rate (%) of the capacity reduced during storage to the capacity before storage was calculated. The obtained value was considered as a self-discharge rate. The self-discharge rate of the battery A was 20% on average.

Using a separator with the air permeability smaller than 1 ml/cm$_2$·s, the same evaluation as in Example 1 was conducted. The result was that, while the self-discharge characteristic was improved, the cycle life characteristic was not improved much as the internal pressure of the battery rose. On the other hand, using a separator with the air permeability larger than 100 ml/cm$^2$·s, the same evaluation as in Example 1 was conducted. The result was that, while the self-discharge characteristic was improved, the discharge capacity in the initial stage slightly decreased.

COMPARATIVE EXAMPLE 1

The sealed battery was produced in the same manner as in Example 1, except that a micro-porous film made of polyethylene having been subjected to a hydrophilic treatment was used. This battery will be referred to as a battery B. The battery B was evaluated in the same manner as in Example 1.

The result in the battery B was that: the discharge capacity measured at an initial stage of the charge/discharge cycles was approximately 1000 mAh; the cycle number at which the discharge capacity became 600 mAh was 100 on average, that is, there was a decrease of about 150 cycles as compared with the battery A; and the self-discharge rate of the battery B was 38% on average, that is, there was an increase of 18% as compared with the battery A.

Figure 2:
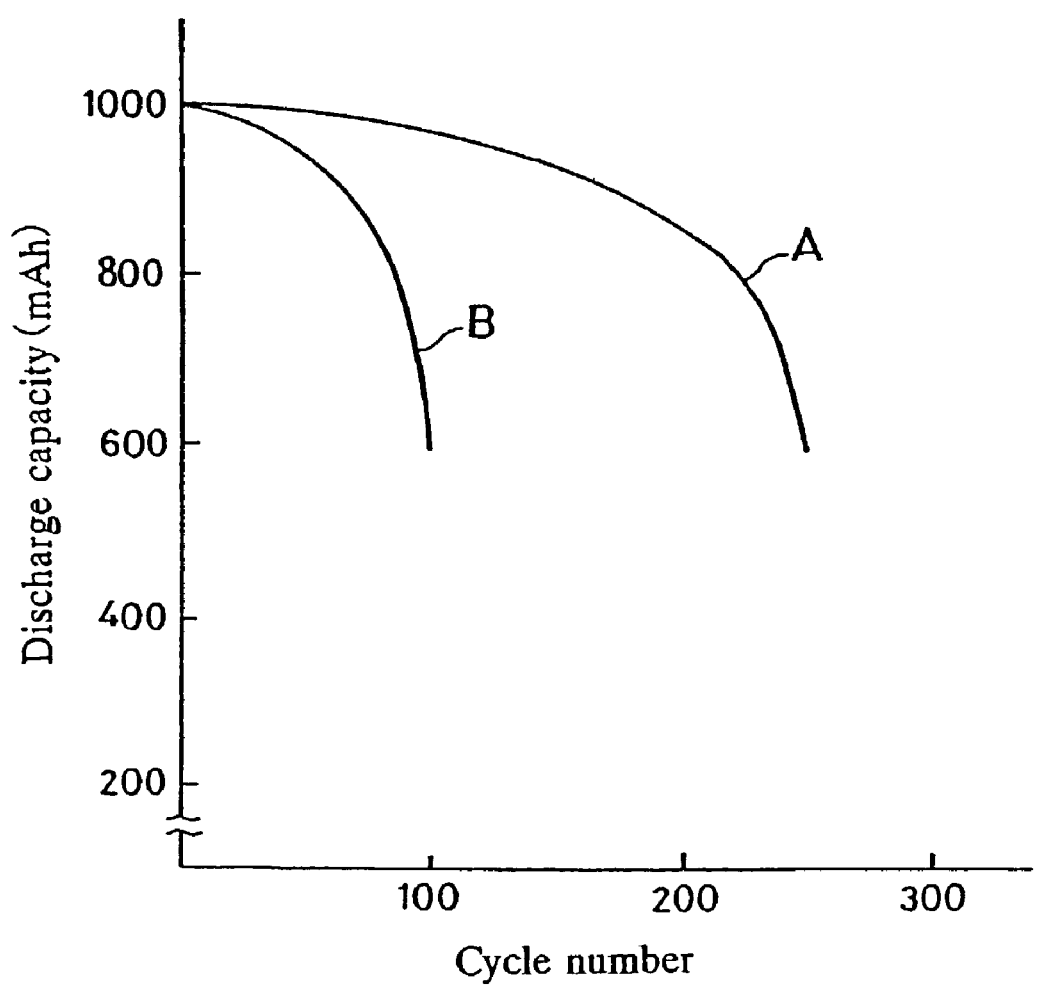
FIG. 2 is a graph showing a relation between charge/discharge cycle number and discharge capacity in the example and the comparative example.

The above results reveal that the cycle life and the self-discharge characteristic of the battery A were superior to those of the conventional battery B. Relations between the discharge capacity and the charge/discharge cycle number of the battery A and the battery B are shown in FIG. 2.

EXAMPLE 2

A sealed battery was produced in the same manner as in Example 1, except that fluorinated carbon ($CF_{1.0}$) was used in place of polytetrafluoroethylene. This battery will be referred to as a battery C. The battery C was evaluated in the same manner as in Example 1. The result in the battery C was that: the discharge capacity measured at an initial stage of the charge/discharge cycles was approximately 1000 mAh; the cycle number at which the discharge capacity became 600 mAh was 260 on average.

EXAMPLE 3

10 Gram of cross-linked type potassium polyacrylate, 125 g of an aqueous solution of potassium hydroxide having a specific gravity of 1.25 g/ml, 0.1 g of carboxymethyl cellulose and 6.75 g of a polytetrafluoroethylene powder were mixed and gelled. The obtained gel was applied on both faces of a micro-porous film made of polyethylene used in Comparative Example 1, and then dried. A separator layer having a thickness of 150 m was thus produced. Air permeability across this separator layer was about 10 ml/cm$^2$·s at a pressure difference of 124 Pa. A sealed battery was produced in the same manner as in Example 1, except that the obtained separator layer was used. This battery will be referred to as a battery D. The battery D was evaluated in the same manner as in Example 1. The result in the battery D was that: the discharge capacity measured at an initial stage of the charge/discharge cycles was approximately 1000 mAh; the cycle number at which the discharge capacity became 600 mAh was 260 on average.

EXAMPLE 4

10 Gram of cross-linked type potassium polyacrylate, 125 g of an aqueous solution of potassium hydroxide having a specific gravity of 1.25 g/ml, 0.1 g of carboxymethyl cellulose and 6.75 g of a polytetrafluoroethylene powder were mixed and gelled. The obtained gel was applied on both faces of the positive electrode and the negative electrode used in Example 1, and then dried to a certain degree. The thickness of thus obtained separator layer after lamination of the positive electrode and the negative electrode was measured, and the thickness was about 140 μm.

Using the positive electrode and the negative electrode having the obtained separator layer on both faces thereof, a sealed battery was produced in the same manner as in Example 1. This battery will be referred to as a battery E. The battery E was evaluated in the same manner as in Example 1. The result in the battery E was that: the discharge capacity measured at an initial stage of the charge/discharge cycles was approximately 1000 mAh; the cycle number at which the discharge capacity became 600 mAh was 265 on average.

EXAMPLE 5

As the positive electrode active material, electrolytic manganese dioxide was used in place of nickel hydroxide. 10 parts by weight of graphite and a proper amount of water were added to 100 parts by weight of this active material, to give a mixture. The pores of a foamed nickel sheet having a thickness of 1.2 mm were filled with the obtained paste-like mixture. The foamed nickel sheet filled with the active material was dried, followed by rolling and cutting, to produce a positive electrode comprising manganese dioxide.

In the meantime, a zinc powder, a zinc oxide powder, acetylene black as a conductive agent and polytetrafluoroethylene as a binder were mixed in a weight ratio of 90:5:4:1. The mixture was then added with a proper amount of ethanol to give a paste-like mixture, which was then filled into the pores of a foamed copper sheet having a thickness of 1.2 mm. The foamed copper sheet filled with the active material was dried, followed by rolling and cutting, to produce a negative electrode.

Using the positive electrode and the negative electrode thus produced, a sealed battery was produced in the same manner as in Example 1. This battery will be referred to as a battery F. The battery F was evaluated in the same manner as in Example 1. The result in the battery F was that: the discharge capacity at an initial stage of the charge/discharge cycles was approximately 1000 mAh; the cycle number at which the discharge capacity became 600 mAh was 100 on average; and the self-discharge rate was about 20% on average.

COMPARATIVE EXAMPLE 2

A sealed-battery was produced in the same manner as in Example 5, except that a micro-porous film made of polyethylene having been subjected to a hydrophilic treatment was used in place of the separator layer used in Example 5. This battery will be referred to as a battery G. The battery G was evaluated in the same manner as in Example 5.

The result in the battery G was that: the discharge capacity measured at an initial stage of the charge/discharge cycles was approximately 1000 mAh; the cycle number at which the discharge capacity became 600 mAh was 50 on average, that is, the cycle number of the battery G was down about 50 from that of the battery F; and the self-discharge rate of the battery G was 25% on average, that is, the self-discharge rate of the battery G was up 5% from that of the battery F.

The above results reveal that the cycle life and the self-discharge characteristic of the battery F were superior to those of the conventional battery G.

It should be noted that, in a case where an air zinc alkaline storage battery was produced using an air electrode comprising carbon for a positive electrode, there seen improvements of the cycle life and self-discharge characteristic of this battery with the use of the separator layer in accordance with the present invention, as in the case of the nickel-zinc secondary battery.

INDUSTRIAL APPLICABILITY

In the present invention, an alkaline zinc secondary battery, which can be produced at low cost, having long cycle life and small self-discharge, can be obtained.

The invention claimed is:

1. An alkaline zinc secondary battery comprising:
   a positive electrode;
   a negative electrode comprising at least one selected from the group consisting of zinc and zinc oxide; and
   a mixture of a gel electrolyte and a water repellent interposed, as a separator layer, between the positive electrode and the negative electrode, said gel electrolyte comprising a water absorbent polymer and an alkaline aqueous solution.

2. The alkaline zinc secondary battery in accordance with claim 1, wherein said water absorbent polymer is a cross-linked polymer containing at least one monomer unit selected from the group consisting of an acrylate unit and a methacrylate unit.

3. The alkaline zinc secondary battery in accordance with claim 2, wherein said monomer unit is at least one selected from the group consisting of a potassium acrylate unit, a sodium acrylate unit, a potassium methacrylate unit and a sodium methacrylate unit.

4. The alkaline zinc secondary battery in accordance with claim 1, wherein said water repellent comprises at least one selected from the group consisting of fluorinated carbon and fluorocarbon resin.

5. The alkaline zinc secondary battery in accordance with claim 1, wherein said separator layer has a core made of a non-woven fabric and said non-woven fabric comprises polyolefin or polyamide.

6. The alkaline zinc secondary battery in accordance with claim 1, wherein said separator layer has a core made of a micro-porous film and said micro-porous film comprises polyolefin or regenerated cellulose.

7. The alkaline zinc secondary battery in accordance with claim 1, wherein said separator layer is integrated with at least either the surface of said positive electrode or the surface of said negative electrode.

8. The alkaline zinc secondary battery in accordance with claim 1, wherein said separator layer further comprises a binder comprising at least one selected from the group consisting of polyethylene, polypropylene, carboxymethyl cellulose, styrene-butadiene rubber and polyvinyl alcohol.

9. The alkaline zinc secondary battery in accordance with claim 1, wherein air permeability across said separator layer is from 1 to 100 ml/cm$^2$·s at a pressure difference of from 120 to 130 Pa.

10. The alkaline zinc secondary battery in accordance with claim 1, wherein said separator layer has a thickness of from 5 to 200 μm.

11. The alkaline zinc secondary battery in accordance with claim 1, wherein said positive electrode comprises nickel hydroxide, manganese dioxide or carbon.

12. The alkaline zinc secondary battery in accordance with claim 1, wherein the mixture of gel electrolyte and water repellent is applied to both faces of a core of non-woven fabric.

13. The alkaline zinc secondary battery in accordance with claim 1, wherein the mixture of gel electrolyte and water repellent is applied to both faces of a core of a micro-porous film.

14. The alkaline zinc secondary battery in accordance with claim 1, wherein the separator layer comprises water repellent in an amount of 8 parts by weight or less per 100 parts by weight of the total of the water absorbant polymer and the alkaline aqueous solution.

15. A method for producing an alkaline zinc secondary battery comprising the steps of:
   (1) a first step of producing a negative electrode comprising at least one selected from the group consisting of zinc and zinc oxide and a positive electrode;
   (2) a second step of mixing a water absorbent polymer, an alkaline aqueous solution and a water repellent, the mixture then being used to produce a separator layer in a sheet form comprising a gel electrolyte and said water repellent;
   (3) a third step of laminating said positive electrode and said negative electrode with said separator layer disposed therebetween, to obtain an electrode assembly; and
   (4) a fourth step of fabricating an alkaline zinc secondary battery with the use of said electrode assembly obtained in said third step.

16. The method for producing an alkaline zinc secondary battery in accordance with claim 15, wherein said water repellent comprises at least one selected from the group consisting of fluorinated carbon and fluorocarbon resin.

17. The method for producing an alkaline zinc secondary battery in accordance with claim 15, wherein the water repellent is added to the mixture in step (2) in an amount of 8% parts by weight or less per 100 parts by weight of the total of the water absorbant polymer and the alkaline aqueous solution in the mixture.

18. A method for producing an alkaline zinc secondary battery comprising the steps of:
   (1) a first step of producing a negative electrode comprising at least one selected from the group consisting of zinc and zinc oxide and a positive electrode;
   (2) a second step of mixing a water absorbent polymer, an alkaline aqueous solution and a water repellent, the mixture then being applied on at least either the surface of said positive electrode or the surface of said negative electrode to form a separator layer comprising a gel electrolyte and said water repellent which is in intimate contact with said surface;
   (3) a third step of laminating said positive electrode and said negative electrode with said separator layer disposed therebetween to obtain an electrode assembly; and
   (4) a fourth step of fabricating an alkaline zinc secondary battery with the use of said electrode assembly obtained in said third step.

19. The method for producing an alkaline zinc secondary battery in accordance with claim 18, wherein said water repellent comprises at least one selected from the group consisting of fluorinated carbon and fluorocarbon resin.

20. The method for producing an alkaline zinc secondary battery in accordance with claim 18, wherein said water repellent is added to the mixture in the step (2) in an amount of 8 part by weight or less per 100 by weight of the total of the water absorbant polymer and the alkaline aqueous solution in the mixture.

* * * * *

UNITED STATES PATENT AND TRADEMARK OFFICE
CERTIFICATE OF CORRECTION

| | | |
|---|---|---|
| PATENT NO. | : 7,153,607 B2 | |
| APPLICATION NO. | : 10/129488 | |
| DATED | : December 26, 2006 | |
| INVENTOR(S) | : Chiaki Iwakura et al. | |

It is certified that error appears in the above-identified patent and that said Letters Patent is hereby corrected as shown below:

On the title page item [54] and col. 1 change "ALKALINE ZINC SECONDARY CELL AND METHOD FOR PREPARATION THEREOF" to -- ALKALINE ZINC SECONDARY BATTERY AND METHOD FOR PRODUCING THE SAME --

Signed and Sealed this

Twelfth Day of June, 2007

JON W. DUDAS
*Director of the United States Patent and Trademark Office*